United States Patent
Heer et al.

(10) Patent No.: US 9,140,351 B2
(45) Date of Patent: Sep. 22, 2015

(54) BEVEL GEAR FOR A BEVEL-GEAR TRANSMISSION

(75) Inventors: Manfred Heer, Landkern (DE); Michael Potts, Wismar (DE)

(73) Assignee: SCHOTTEL GMBH, Spay (DE)

( * ) Notice: Subject to any disclaimer, the term of this patent is extended or adjusted under 35 U.S.C. 154(b) by 227 days.

(21) Appl. No.: 13/508,955

(22) PCT Filed: Apr. 8, 2011

(86) PCT No.: PCT/EP2011/001770
§ 371 (c)(1),
(2), (4) Date: Jun. 14, 2012

(87) PCT Pub. No.: WO2011/147502
PCT Pub. Date: Dec. 1, 2011

(65) Prior Publication Data
US 2013/0192401 A1    Aug. 1, 2013

(30) Foreign Application Priority Data
May 27, 2010    (DE) .......................... 10 2010 021 768

(51) Int. Cl.
| | |
|---|---|
| F16H 55/08 | (2006.01) |
| B23F 1/02 | (2006.01) |
| B23F 1/06 | (2006.01) |
| B23F 19/00 | (2006.01) |

(52) U.S. Cl.
CPC *F16H 55/08* (2013.01); *B23F 1/02* (2013.01); *B23F 1/06* (2013.01); *B23F 19/00* (2013.01); *F16H 55/0846* (2013.01); *F16H 55/0886* (2013.01); *Y10T 29/49476* (2015.01); *Y10T 29/49478* (2015.01); *Y10T 74/1987* (2015.01)

(58) Field of Classification Search
CPC .................. Y10T 29/49478; Y10T 29/19176; Y10T 74/1987; Y10T 29/49464; Y10T 29/49467; B23F 1/02; B23F 1/06; B23F 19/00
See application file for complete search history.

(56) References Cited

U.S. PATENT DOCUMENTS

| | | | | |
|---|---|---|---|---|
| 3,984,905 | A | * | 10/1976 | Petzoldt ........................ 29/38 R |
| 6,351,886 | B1 | | 3/2002 | Hasegawa |
| 7,251,542 | B2 | * | 7/2007 | Arvin ............................ 700/159 |
| 7,406,892 | B2 | * | 8/2008 | Takeuchi et al. ................ 74/440 |
| 7,566,373 | B2 | * | 7/2009 | Takayama ..................... 148/572 |
| 7,950,305 | B2 | * | 5/2011 | Gutmann et al. ............... 74/457 |
| 8,821,216 | B2 | * | 9/2014 | Schaeferling et al. .......... 451/47 |
| 2003/0108384 | A1 | | 6/2003 | Huang |
| 2005/0198808 | A1 | | 9/2005 | Fisher et al. |
| 2013/0118282 | A1 | | 5/2013 | Potts |

FOREIGN PATENT DOCUMENTS

| | | |
|---|---|---|
| DE | 1625599 A | 8/1970 |
| DE | 4441088 A | 5/1996 |

* cited by examiner

*Primary Examiner* — Richard Chang
(74) *Attorney, Agent, or Firm* — Andrew Wilford

(57) ABSTRACT

The invention relates to a bevel gear wheel of a bevel gear mechanism, the teeth of which bevel gear wheel have in each case a load flank and a rear flank, wherein the rear flanks have an engagement region for rear flanks of the meshing gear wheel, wherein the outer region, which surrounds the original maximum possible usable engagement region which normally comes into engagement, of the rear flank and an outer edge region of the original engagement region are reduced in terms of the face height thereof such that said reduced regions always remain free from contact and only the remaining, inner, raised region which is reduced in size comes into contact.

3 Claims, 1 Drawing Sheet

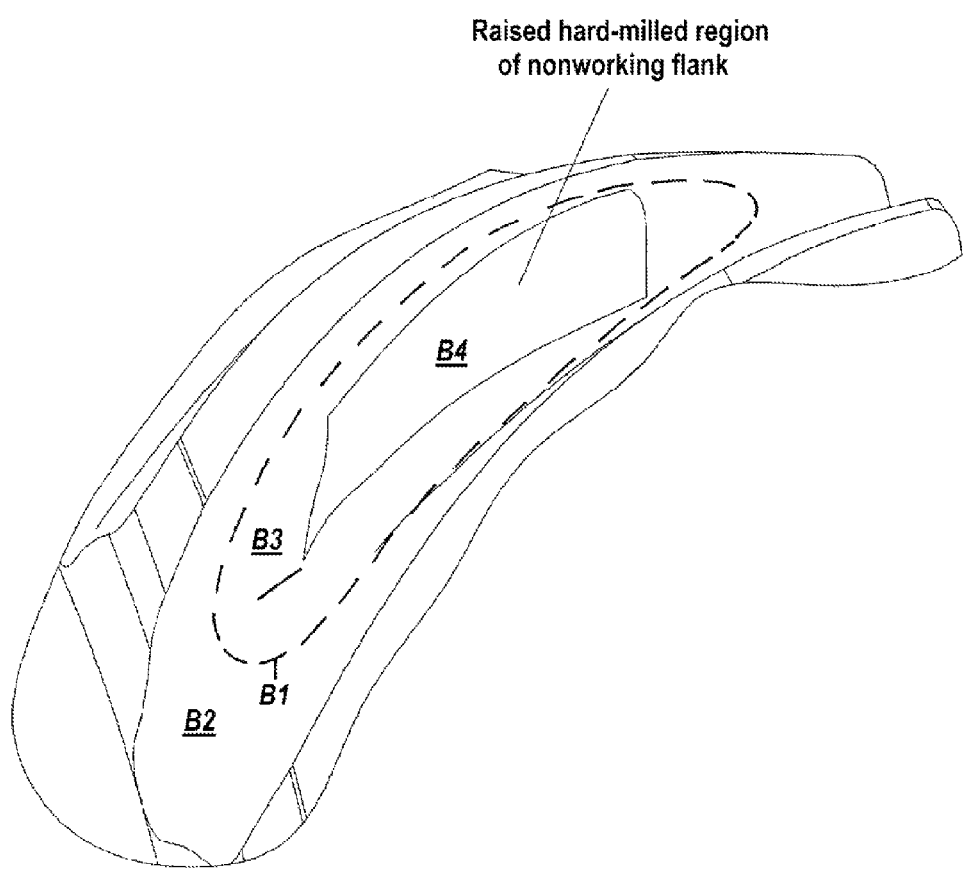

BEVEL GEAR FOR A BEVEL-GEAR TRANSMISSION

CROSS REFERENCE TO RELATED APPLICATIONS

This application is the US-national stage of PCT application PCT/EP2011/001770 filed 8 Apr. 2011, published 1 Dec. 2011 as WO2011/147502, and claiming the priority of German patent application 102010021768.9 itself filed 27 May 2010, whose entire disclosures are herewith incorporated by reference.

FIELD OF THE INVENTION

The invention relates to a bevel gear of a bevel-gear transmission with teeth each having a load flank and a nonworking flank, and to a method of making same.

BACKGROUND OF THE INVENTION

The tooth geometry of bevel gears is always symmetrical to an axis of symmetry that runs radially through the center of the gear through the tooth. This is justified on the basis that gears are generally designed and produced to operate in both directions (forward and backward). Current production methods are limited in the degree of freedom for production and are optimized with the aim of producing many teeth of a toothed gear simultaneously. Depending on the direction of operation, an individual tooth during the transmission of torque has a load flank that is engaged and transmits the torque onto the load flank of the opposing tooth. When the toothed gear rotates, the nonworking flank of a tooth comes into contact either partially or not at all with the following opposing tooth of the meshing gear tooth as long as there is no reversal in the direction of rotation.

Toothed gears are generally designed for both directions of rotation irrespective of actual use. In practice, bevel-gear transmissions often do not require any reversal in the direction of rotation. Nevertheless, the flanks of the individual teeth of a toothed gear are produced and further machined for both rotational directions.

What is not considered here is the fact that when rotating in the reverse direction the nonworking flanks do not necessarily have the same function as the load flanks of their respective teeth. During the manufacturing of the toothed gear, the same amount of material is normally removed on the nonworking flank as on the load flank. Both tooth flanks subsequently undergo finishing to an equal extent, which is often costly, i.e., the nonworking flanks are completely hardened or receive surface treatment.

OBJECT OF THE INVENTION

The object of this invention is to improve a bevel gear of the type described above such that the required fabrication expense is reduced and thus lower costs are incurred for making the nonworking flank.

In addition, the object of the invention is to provide expanded possibilities of shaping design for the body of the tooth and the load flank so as to reduce wear and gear rolling noise.

SUMMARY OF THE INVENTION

This object is achieved according to the invention by an approach wherein the tooth nonworking flank is given an engagement region that is adapted and optimized for the expected load. The nonessential surface areas of the tooth flank "jump back," i.e. three-dimensional material-removing methods are used to remove material from nonessential surfaces to the extent that they no longer come into contact with the following opposing gear tooth of a meshing toothed gear. The desired or required tooth flank surface is thus raised relative to the material-removed regions. The reduced inner region raised here comprises 10 to 40 percent, preferably 20 to 30 percent, of the total flank surface.

The advantage of such raised surfaces generated in an early stage of fabrication is that a plane of action (load contact region) that is optimized and reduced for the actual load is produced as early as possible. It is simpler to make gross modifications to the teeth at an early fabrication stage than after completing finishing procedures such as hardening the tooth flanks. Producing the minimally required plane of action (load contact region) enables one to minimize contact surfaces that actually will be engaged, thereby reducing gear rolling noise.

An especially advantageous aspect is that only a reduced minimum engagement region relative to the entire tooth surface is finished. This means that only the actually required region of each tooth is finished, for example hardened or polished, during the high-precision finishing process. This reduces manufacturing costs.

Another advantage is the fact that additional subsequent surface-treatment fabrication procedures, for example "hard milling," are similarly effected only on the raised regions of the nonworking flanks. This saves time in manufacture and reduces cost due to the shortened processing period and also to reduced tool wear.

In particular, this procedure also reduces the automated or the manual fine-finishing operation on tooth flanks that exhibit hardening distortion in flank geometry after hardening.

Another advantage is the fact that the reduced remaining raised region can be more quickly polished manually or lapped by machine due to the optimized size of the plane of action (load contact region).

BRIEF DESCRIPTION OF THE DRAWING

A sectional section through an embodiment of the invention is shown in the drawing and will be described in more detail below.

SPECIFIC DESCRIPTION OF THE DRAWING

On its frustoconical outer surface, the bevel gear has multiple teeth distributed over its circumference, each of which has a load flank and a nonworking flank B2.

Since a preferred direction of rotation for the transmission of torque is intended for toothed gears, load and nonworking flanks have different functions that are expressed in a differing geometry. The shape selected for a tooth flank, however, determines the shape of the opposing flank on the opposing toothed gear. When two toothed gears mesh, both tooth flanks here are never engaged completely. Only part of the overall tooth flank can be used as the maximum possible usable engagement region B1. The remaining outer region of the nonworking flank B2, which surrounds usable engagement region B1, does not come into contact with the opposing tooth.

In the forward direction of rotation, the load flank serves to transmit torque during normal operation and in its construction is designed having a large plane of action (load contact region). This usable engagement region B1 is generally produced to be as large as possible so as to achieve a maximum transmission of torque for a permissible contact pressure on the surface of the tooth.

The nonworking flank B2 is employed, if at all, only to transmit low-level torques in the reverse direction of rotation. The surface height of original engagement region B1 is thus reduced at an early phase of fabrication around an outer edge region B3 to the extent that this region B3 always stays free of contact. What remains is the inner raised region B4 that has an engagement-region-optimized tooth flank topography.

The raised inner region B4 is the remaining reduced engagement region of the nonworking flank B2 that engages the opposing tooth. This reduced inner region B4 constitutes between 10 and 40 percent, preferably 20 to 30 percent of the nonworking flank B2, of the total flank area B1+B2. The maximum required engagement region of the nonworking flank B2 here is a function of the maximum torque to be accommodated and the maximum permissible contact pressure.

Producing the optimized tooth flank topography requires a three-dimensional removal of material along the tooth profile and the tooth flank. The removal of material, in particular, by milling or grinding the teeth, is implemented here with high precision. Sufficient material in unwanted regions of the nonworking flank B2 here is removed such that they cannot come into contact with the opposing flanks even after hardening due to hardening distortion. The extent of three-dimensional removal of material is also largely also determined by the fact that in response to load-induced deformation of the tooth flank only the desired reduced, inner region B4 of the nonworking flank B2 engages, while the remaining regions of the nonworking flank B2 do not.

A multi-dimensional (four-axis and multi-axis, in particular, five-axis) milling machine is used to form this special tooth flank topography on the nonworking flanks B2 of the teeth.

In order to smooth the remaining raised regions B4, hardening is followed by using a multidimensional (four-axis or multi-axis, in particular, five-axis) milling machine to hard-mill or grind the surface.

The final surface finishing procedure in fabricating the bevel gear is the manual polishing or machine lapping of remaining raised regions B4 of the tooth flanks.

The invention claimed is:

1. A method of making a bevel gear with a plurality of teeth each having a load flank and a nonworking flank, each of the nonworking flanks of the bevel gear having an engagement region for engagement when in use with teeth of another similar meshing toothed gear, the method comprising the steps of sequentially:

casting a blank from steel to form a round wheel of unhardened material;

milling or grinding the round wheel of unhardened material to form on it teeth having outer surfaces;

thereafter, without hardening outer and edge regions of the wheel, removing material with high precision from the surfaces of the teeth formed on the round wheel by milling or grinding using a four- or multi-axis method so as to produce lowered surfaces or regions that can no longer make contact with the teeth of the other meshing toothed gear and so as to produce a reduced-area raised inner region that measures 10 to 40 percent of the surface of the respective flank of the respective tooth from which material has been removed; and hardening at least the inner raised regions of the teeth of the round wheel.

2. The method defined in claim 1, further comprising the step after hardening of:

hard milling or grinding remaining raised regions.

3. The method defined in claim 2, wherein the remaining raised region is polished manually or lapped.

* * * * *